United States Patent [19]

Takebayashi et al.

[11] Patent Number: 4,788,692
[45] Date of Patent: Nov. 29, 1988

[54] ADAPTIVE DIFFERENTIAL PULSE CODE MODULATION SYSTEM

[75] Inventors: Tomoyoshi Takebayashi, Hiratsuka; Kaoru Yamamoto, Chofu; Tsuyoshi Miyazaki, Kawasaki; Kazuo Murano, Tokyo; Hiromi Mori, Kawasaki, all of Japan

[73] Assignee: Fujitsu Limited, Kawasaki, Japan

[21] Appl. No.: 876,455

[22] Filed: Jun. 20, 1986

[30] Foreign Application Priority Data

Jun. 20, 1985 [JP] Japan .................. 60-134638
Aug. 1, 1985 [JP] Japan .................. 60-170488
Aug. 16, 1985 [JP] Japan .................. 60-180181

[51] Int. Cl.$^4$ ............................ H04B 14/06
[52] U.S. Cl. ......................... 375/27; 375/8; 332/11 R; 358/135
[58] Field of Search ............. 375/27, 8, 5, 33, 13, 375/25, 30, 31; 332/11 R; 358/13, 133, 135, 130

[56] References Cited

U.S. PATENT DOCUMENTS 4,437,087 3/1984 Petr ..................... 375/27
4,569,058 2/1986 Grallert ................. 375/27

OTHER PUBLICATIONS

Dukhovich; "A DPCM System Based on a Composite Image Model;" Conference: *NTC IEEE 1980 National Telecommunications Conference;* Houston, Tex. (30 Nov.–4 Dec. 1980); pp. 36-2-1-6.

W. R. Daumer et al.: "Overview of the ADPCM Coding Algorithm", CH2064-4/84/0000-0774 1884–IEEE, pp. 774 to 777.

The Counsel CCITT vol. VIII, V29, Nov. 1980, p. 171.

Tomoyoshi Takebayashi et al.: "A 32 kps ADPCM with Improvement in Coding Characteristics for 9600 bps Modem Signal", ICASSP86 Tokyo, CH 2243-4/86/0000-2187, 1986 IEEE, pp. 2187 to 2190.

*Primary Examiner*—Robert L. Griffin
*Assistant Examiner*—Andrew J. Telesz, Jr.
*Attorney, Agent, or Firm*—Staas & Halsey

[57] ABSTRACT

An adaptive differential pulse code modulation system includes an adaptive quantizer and an adaptive predictor which have a coding characteristic optimized to a voice signal, and a quantizer and a predictor which have a coding characteristic optimized to a voice band MODEM signal. This system is normally used as a coding system optimized to the voice signal, and when this system detects a MODEM training signal, it becomes a coding system optimized to the MODEM signal.

6 Claims, 7 Drawing Sheets

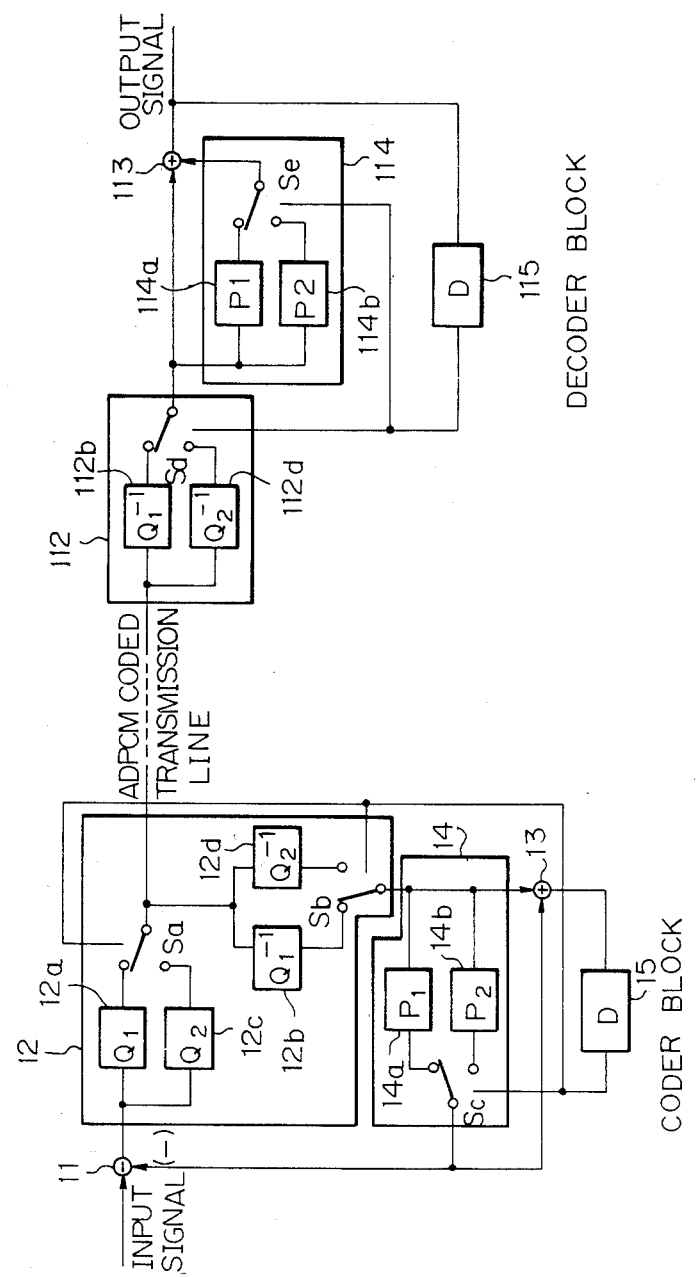

ADAPTIVE DIFFERENTIAL PULSE CODE MODULATION SYSTEM

BACKGROUND OF THE INVENTION

1. Field of the Invention

The present invention relates to an adaptive differential pulse code modulation system in which both voice signals and MODEM signals more than 9600 bit/sec can be coded.

2. Description of the Related Arts

To maximize efficient use of a public line, a frequency band of a transmission is compressed by using an ADPCM (Adaptive Differential Pulse Code Modulation) system, and in addition, voice signals and MODEM signals are transmitted by using this public line.

Therefore, conventionally, in a CCITT Counsel G21, it is prescribed that a MODEM signal having a transmission speed of 4800 bit/sec may be coded efficiently.

However, the transmission speed of the MODEM has recently improved, and a speed of more than 9600 bit/sec is used. However, the conventional coder cannot code a MODEM signal of more than 9600 bit/sec.

OBJECT AND SUMMARY OF THE INVENTION

An object of the present invention is to provide an adaptive differential pulse code modulation system which can code a MODEM signal of more than 9600 bit/sec.

The above-mentioned objects can be achieved by an adaptive differential pulse code modulation system including an adaptive quantizer and an adaptive predictor which have a coding characteristic optimized to a voice signal and a quantizer and a predictor which have a coding characteristic optimized to a voice band MODEM signal. In this system, a coding system is normally optimized to the voice signal, but when the system detects a MODEM training signal, it becomes a coding system optimized to the MODEM signal of more than 9600 bit/sec.

BRIEF DESCRIPTION OF THE DRAWINGS

FIG. 4 is block diagram of another system of the present invention;

DESCRIPTION OF THE PREFERRED EMBODIMENTS

Figure 1:
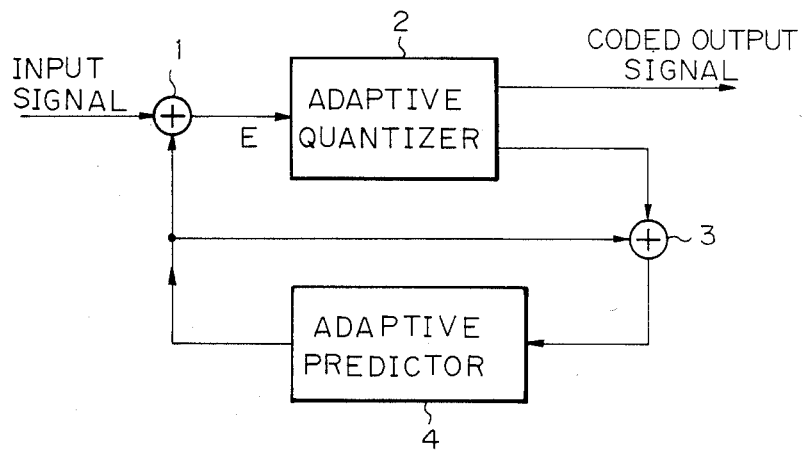
FIG. 1 is a block diagram of one example of a conventional ADPCM coding system.

FIG. 1 shows a block diagram of one example of a conventional ADPCM coding apparatus. In FIG. 1, references 1 and 3 designate adders, 2 an adaptive quantizer, and 4 an adaptive predictor. In FIG. 1, the adaptive quantizer 2 has an optimum coding characteristic. The output of the adaptive quantizer 2 is supplied, via the adder 3, to the adaptive predictor 4, and a predicted output of the adaptive predictor 4 is supplied to the adder 1 and to the adder 3.

Figure 2:
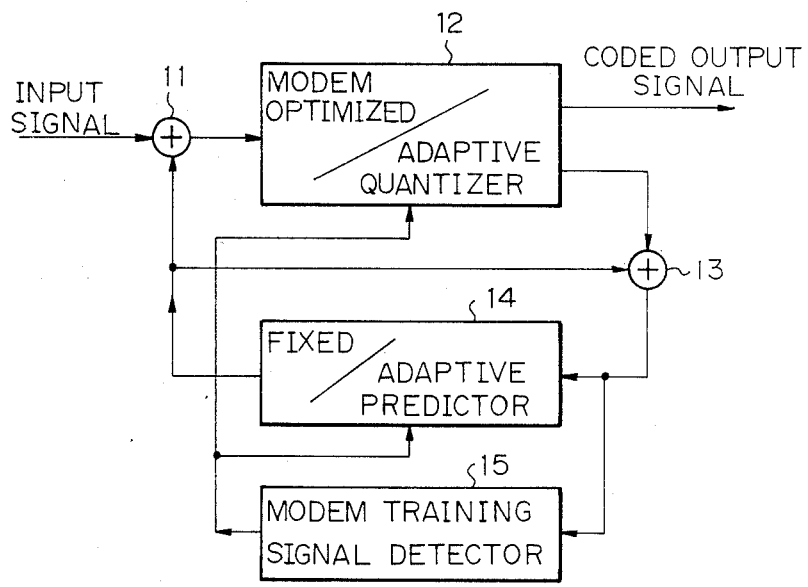
FIG. 2 is a block diagram of an ADPCM coding system according to the present invention.

FIG. 2 shows a block diagram of an ADPCM coding apparatus according to one embodiment of the present invention.

In the drawing, references 11, 13 denote adders, 12 a quantizer which is switchable between a MODEM optimized quantizer state and an adaptive quantizer state, 14 a predictor which is switchable between a modem optimized fixed predictor state and an adaptive predictor state, and 15 is a MODEM training signal detector.

In FIG. 2, the quantizer 12 is normally set to operate as an adaptive quantizer having an optimum coding characteristic for the voice signal, and the predictor 14 is set to operate as an adaptive predictor, so that the ADPCM coding apparatus operates as a system for the voice signal.

When the MODEM training signal, which must be transmitted just before data signals by the modem itself, is input to the apparatus, it is detected by the MODEM training signal detector 15 (a detailed explanation thereof is given later), the quantizer 12 is switched to the MODEM optimized quantizer state optimum for the MODEM signal, and the predictor 14 is switched to the fixed predictor state optimum for the MODEM signal, so that the coding apparatus becomes in the optimum state for the MODEM signal, to code the MODEM signal.

The signal power of the input signal is always supervised, and when it becomes small enough, the coder recognizes that the transmission of data is terminated, then the coding mode is returned to the original voice mode.

Figure 3:
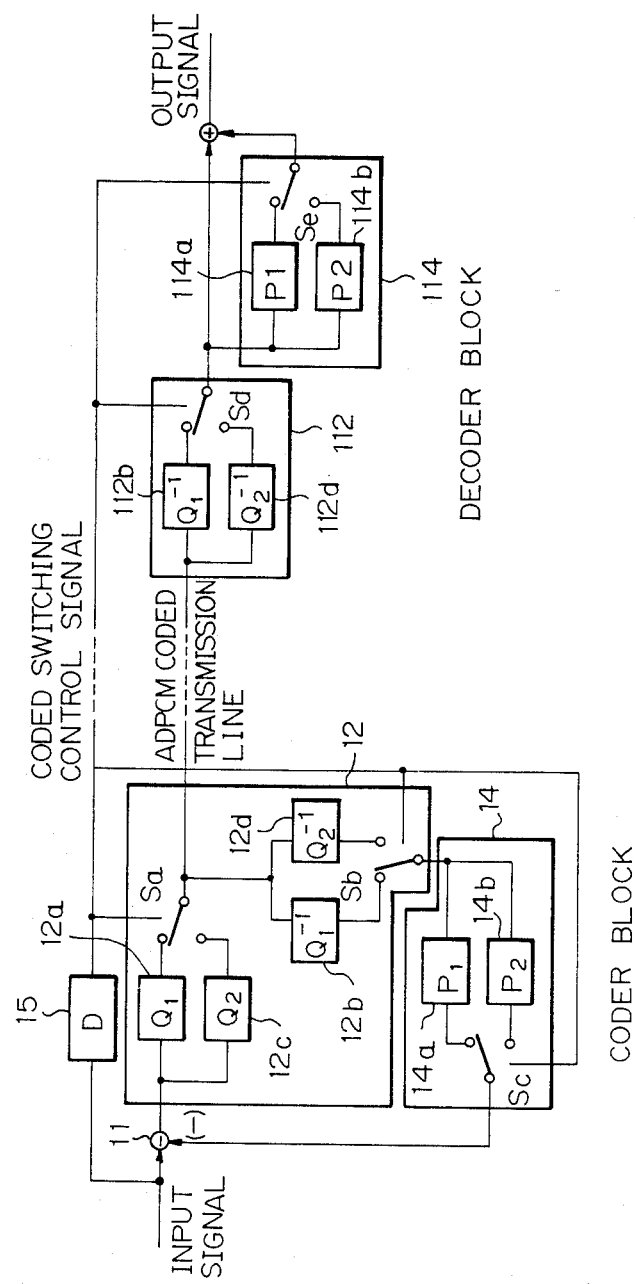
FIG. 3 is a block diagram of the system of the present invention.

FIG. 3 shows a system block diagram of a principle of the invention based on the diagram shown in FIG. 2. In FIG. 3, reference numerals in a coder block 11, 12, 14, and 15 correspond to those used in FIG. 2 and reference numerals 112 and 114 in the decoder block correspond to the reference numerals 12 and 14 in the coder block, respectively. In FIG. 3, the quantizer 12 is formed by a quantizer 12a having a characteristic optimized for a voice signal, an inverse quantizer 12b having a characteristic optimized for a voice signal, a quantizer 12c having a characteristic optimized for a MODEM signal, and an inverse quantizer 12d having a characteristic optimized for a MODEM signal. The predictor 14 is formed by a predictor 14a optimized for a voice signal and a predictor 14b optimized for a MODEM signal. The system block diagram shown in FIG. 3 shows a coder block and a decoder block, and a coded switching control signal is transmitted from the coder block to the decoder block by a transmission line. In FIG. 3, the MODEM training signal detector 15 detects the MODEM training signal and further generates a coded switching control signal, which is transmitted via the transmission line. Switches Sa, Sb, Sc, Sd are controlled by the output of the MODEM training signal detector. In the decoder block shown in FIG. 3, the quantizer 112 is formed by inverse quantizers 112b and 112d corresponding to 12b and 12d in the coder block, and the predictor 114 is formed by predictors 114a and 114b corresponding to 14a and 14b in the coder block.

FIG. 4 is another system block diagram of a a system performing the principle of the present invention based on the diagram shown in FIG. 2. The principle of the diagram in FIG. 4 is almost the same as that of the diagram shown in FIG. 3, the difference therebetween being that, in the case of FIG. 4, the switching control signal is not sent from the coder block to the decoder block but it is formed in the decoder block.

FIG. 5 shows one embodiment of the present invention based on the system block diagram shown in FIG. 4. The set speed is adapted to the speed adapters 24, 25, and a switch S$_2$ selects the adapter 24 or 25 in accordance with whether the input signal is the voice signal or the MODEM signal.

The predictor 14a (P$_1$), is formed by delay elements 31a, 31b, ..., 31n: 34a, 34b, prediction coefficients 32a, 32b, ..., 32n: 35a, 35b, adders 33a, 33b, ..., 33n and 36, and coefficient generating logics 37 and 38. In FIG. 5, the elements 31a~31n, 32a~32n, 33a, 33b, ... and 37 form a zero predictor and elements 34a, 34b, 35a, 35b, 36 and 38 form a pole predictor. Further, the predictor 14b (P$_2$) is formed by the above-mentioned commonly used elements, the zero predictor and a pole predictor including delay elements 41a, 41b, ... 41n, prediction coefficients 42a, 42b, ... 42n, adders 43a, 43b, and the coefficients $C_1, \ldots C_{m-1}, C_m$ (refer to W. R. Daumer et al. already mentioned) are fixed so as to be optimized for the MODEM signal. The predictor 14a (P$_1$) and 14b (P$_2$) are switched by the switch S$_3$ controlled by the output of the modem training signal detector 15.

Figure 5A:
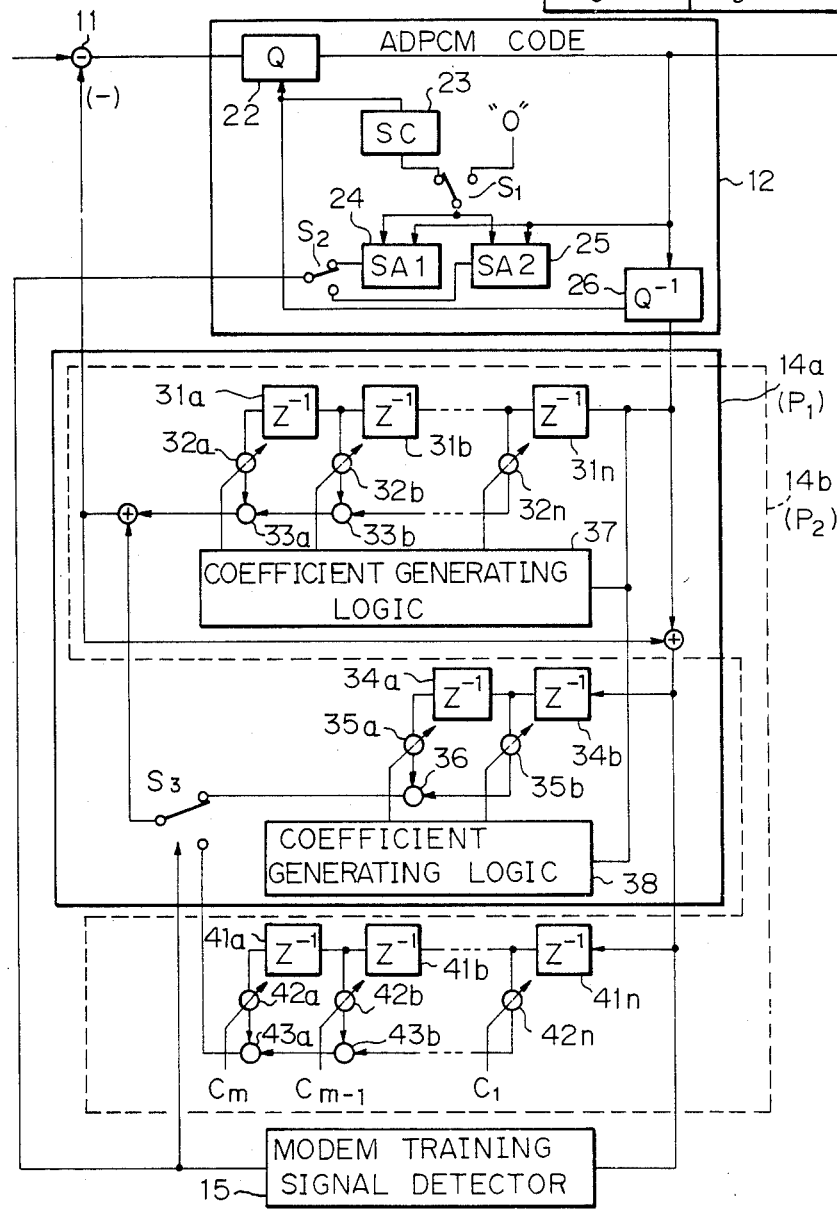
FIGS. 5A and 5B are block diagrams of one embodiment according to the present invention.
Figure 5B:
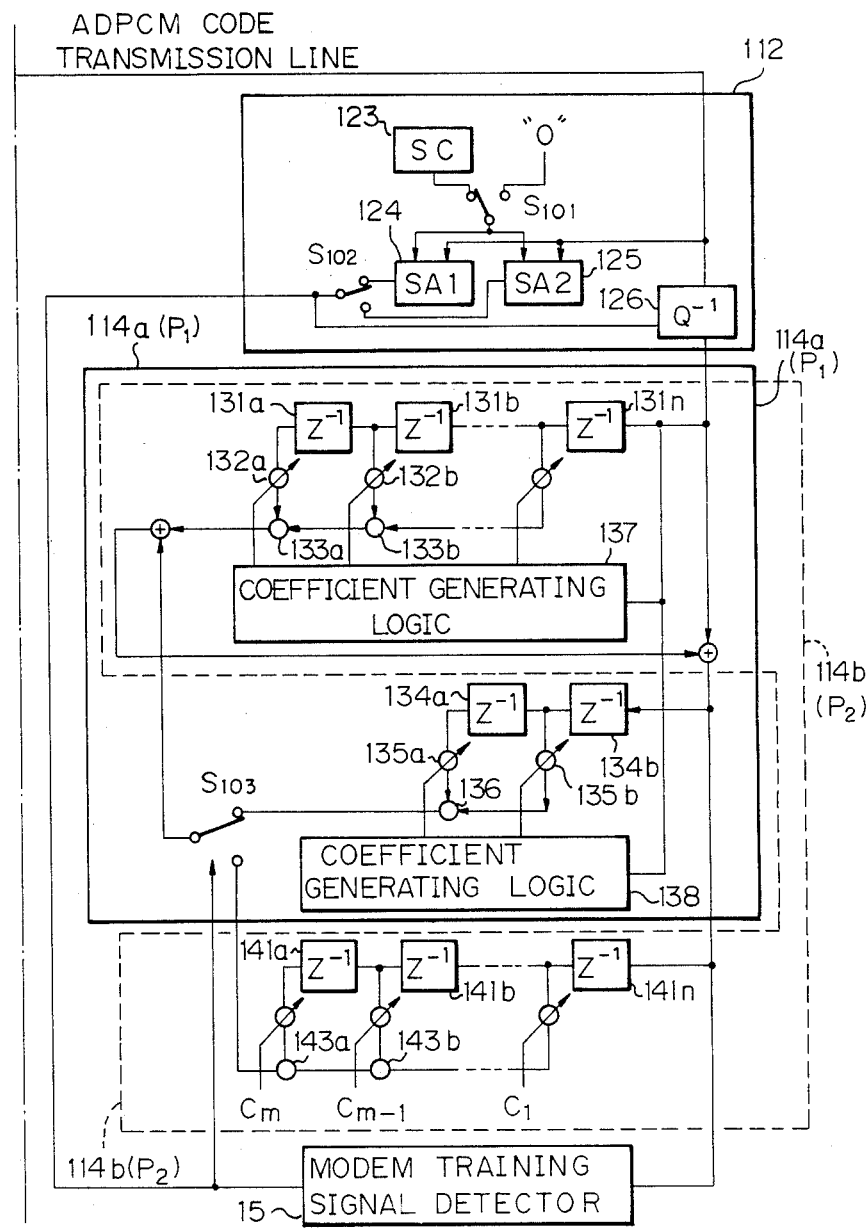

The reference numerals in FIG. 5B show the same elements as in FIG. 5A but with the suffix "1", i.e., 31a becomes 131a, ..., etc. The operation of FIG. 5B is similar to that of FIG. 5A, and therefore, an explanation thereof is omitted.

Figure 6A:
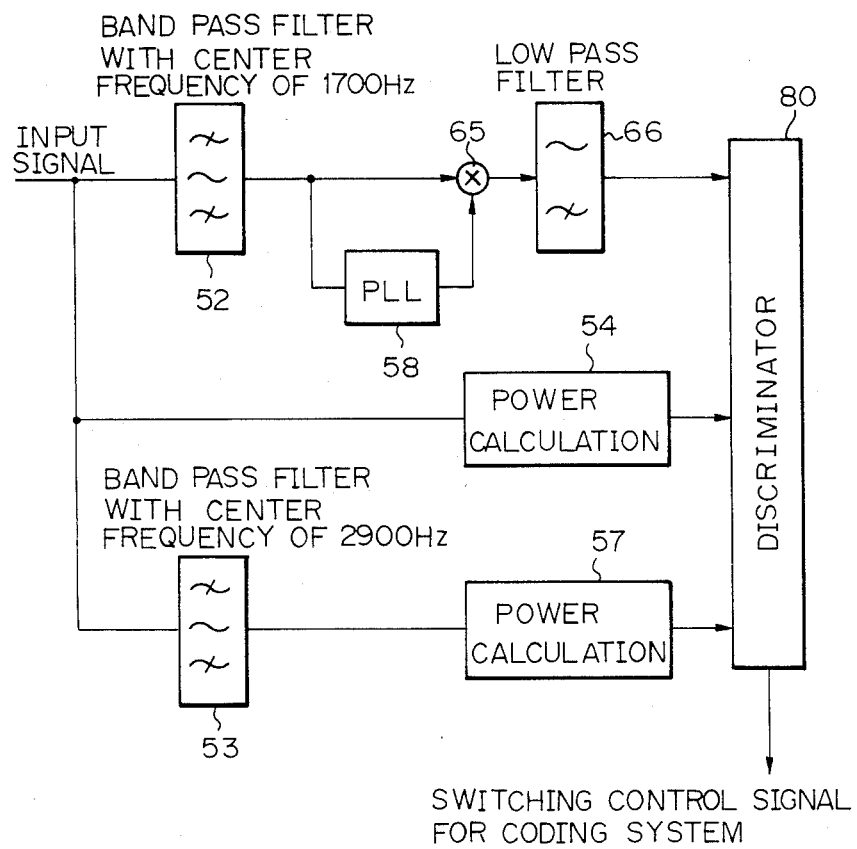
FIGS. 6A and 6B are block diagrams of a MODEM training signal detector of one embodiment of the present invention.

FIG. 6A shows a block diagram of the MODEM training signal detector shown in FIG. 5. FIG. 6A corresponds to FIG. 4 of an article by the same inventor, Tomoyoshi TAKEBAYASHI et al: "A 32 kps ADPCM with improvement in coding characteristics for 9600 bps modem signal, ICASSP86 TOKYO, CH2243-4/86/0000-2187, 1986-IEEE. In the circuit shown in FIG. 6A, an alternate pattern prescribed in the Counsel CCITT V. 29 is detected. The alternate pattern is prescribed on page 171 of the Counsel CCITT V. 29 as follows.

8.1 Segment 2 of synchronizing signal consists of alternations between two signal elements. The first signal element (A) transmitted has a relative amplitude of 3 and defines the absolute phase reference of 180°. The second signal element (B) transmitted depends on the data signalling rate. FIG. 4/V. 29 shows the B signal element at each of the data signalling rates. Segment 2 alternates ABAB ... ABAD or 128 symbol intervals.

In FIG. 6A, 52 designates a band pass filter with a center frequency of 1700 Hz, 53 designates a band pass filter with a center frequency of 2900 Hz, 54 and 57 designate power calculation units, 65 designates a multiplier, 66 designates a low pass filter and 80 designates a discriminator.

Figure 6B:
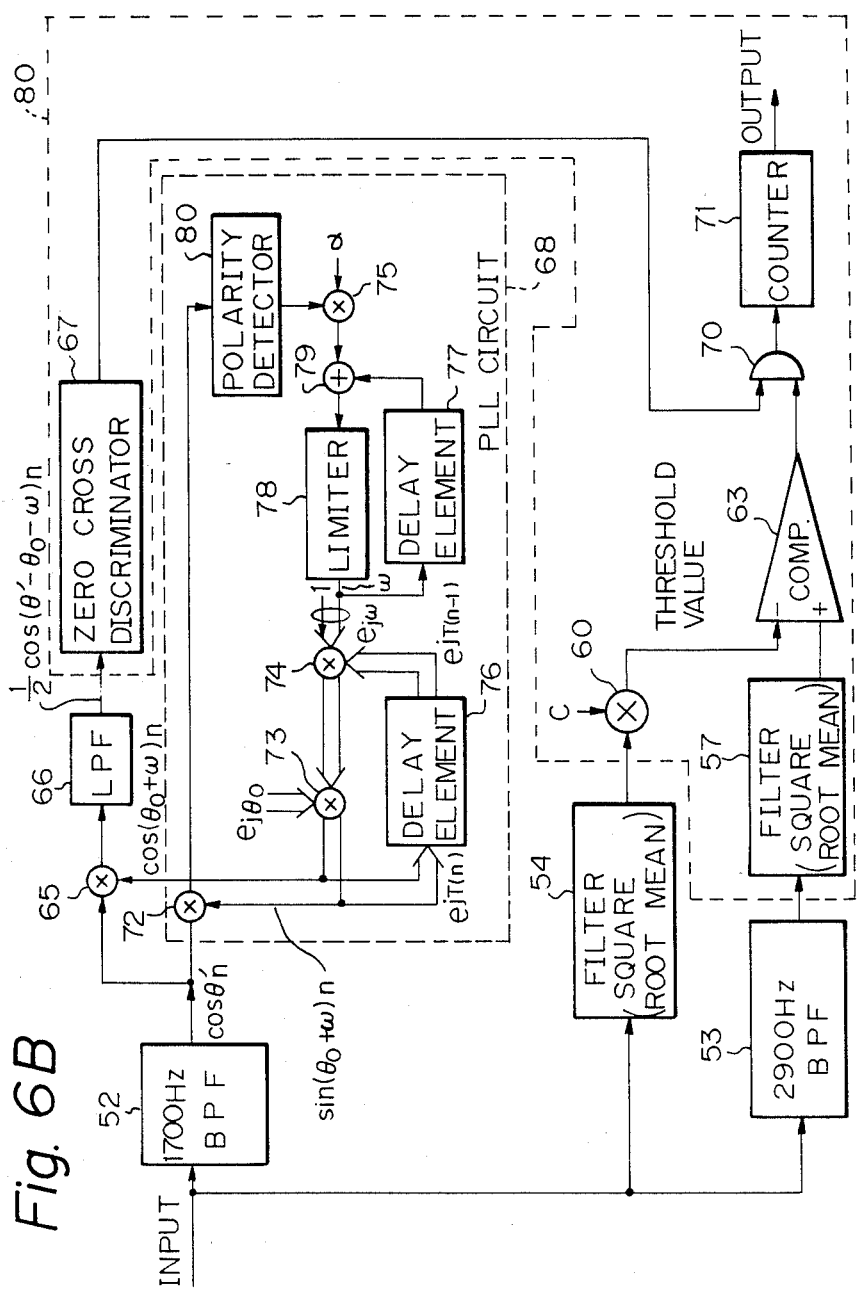

FIG. 6B shows a detailed block diagram of the MODEM training signal detector shown in FIG. 6A. In FIG. 6B, the portions 52, 53, 54, 57 and 57 in the block diagram shown in FIG. 6A correspond to those in FIG. 6B.

In FIG. 6B, a bandpass filter 52 has a center frequency at a center of a carrier frequency, and a multiplier 72 of PLL circuit 68, has an input connected to the output of the bandpass filter 52. A polarity detector 80 is connected to the output of the multiplier 72. The output of the polarity detector 80 is connected to a multiplexer 75, which also receives a small positive value α. An adder 79 is connected to the output of the multiplier 75, and the output of the adder 79 is fed back via a limiter 78 and a delay element 77 to another input of the adder 79. The output of the limiter 78 and a real value "1" are supplied to a complex value multiplexer 74, and the output of the multiplier 74 is fed back via a complex value multiplier 73 having another input for receiving $e^{j\theta}$ and a complex value delay element 76 to another input of the complex value multiplier 74. An imaginary part of the output of the complex multiplier 73 is supplied to another input of the multiplier 72 and an real part $(\cos(\theta_0+\omega)n)$ of the output of the multiplier 73 together with the output of the band pass filter 52 is connected to a multiplier 65. A low pass filter 66 is connected to the output of the multiplier 65 and the output of the low pass filter 66 is connected to a zero cross discriminator 67 having an output connected to an input of an AND gate 70.

On the other hand, the input to the low pass filter 52 is connected to a filter 54 for obtaining a square root means thereof and to a bandpass filter 53 which has a center frequency at an upper limit of the MODE signal band. The output of the filter 54 is connected, via a multiplier receiving a constant C, to an input of a comparator 63, and the output of a filter 54 is connected, via a filter 57 for obtaining a square root means, to another input of the comparator 63 having an output connected to another input terminal of the AND gate 70. The output of the AND gate 70 is connected, via a counter 71, to an output terminal.

Next, the operation of the MODEM training signal detector shown in FIG. 6A will be explained in detail.

As shown in FIG. 6A, an input signal is a carrier signal in a sampling sequence, and the carrier frequency component is extracted in a secondary cyclic filter 52 having a pole close to the carrier frequency.

The output thereof is set as cos $\theta'$ n, wherein $$\theta' = 2\pi fc'/fs$$

where
fc=carrier frequency
fs=sampling frequency

Further, when the input signal of the delay element 76 is set as $e^{jT(n)}$, it is multiplied by $e^{j\omega}$ in the multiplier circuit 74 and is multiplied by $e^{j\theta_0}$ in the multiplier circuit 73 and is then shown by the following equation (1) as the operation of the PLL circuit 68.

$$e^{jT(n)} = e^{jT(n-1)} \times e^{j\omega} \times e^{j\theta_0} \qquad (1)$$

This shows a vector which rotates at an angular frequency $(\theta_0+\omega)$.

Then, if the following equation exists, $$\theta' = \theta_0 + \omega$$

a double frequency component of a carrier frequency and a direct current component is obtained when a real component $\cos(\theta_0+\omega)n$ of $e^{jT(n)}$ is multiplied to cos $\theta'$n of the output of the filter 1 at the multiplier 65, and the direct current component is then obtained by a simple primary cyclic filter 66.

Therefore, a zero cross of this signal is supervised in a zero cross discriminator 67 during a predetermined constant period, and if a zero cross does not exist, the carrier frequency component can be detected, wherein ω is an offset frequency component, and is controlled so as to become $\theta' = \theta_0 + \omega$ by the method as mentioned below.

That is, an imaginary component $\sin(\theta_0 + \omega)n$ of the output $e^{jT(n)}$ of the PLL circuit 68 and an output $\cos\theta'n$ of the filter 52 are multiplied in the multiplier 72, the multiplied signal is detected by the polarity detector 80, multiplied by a coefficient $\alpha$ in the multiplier 25, and then fed back via a integrator formed by the delay element 77 and an adder circuit 79 so that $\omega$ is adaptively controlled.

This is expressed by the following equation.

$$\omega(n+1) = \omega(n) - \alpha \text{Sgn}(\cos\theta'n \cdot \sin\theta_0 n) \quad (2)$$

In the code detector 80, a sign of $$\text{Sgn}(\cos\theta'n \cdot \sin\theta_0 n) = \text{Sgn}(x)$$

can be detected as following.

| | |
|---|---|
| Sgn(x) = 1 | if x ≧ 0 |
| Sgn(x) = −1 | if x < 0 |

Further, $\alpha$ is a positive constant having a sufficiently small value and is multiplied in the multiplier 75.

Moreover, an upper limit and a lower limit are set to $\omega$ so that an offset frequency which is compensated by this PLL circuit 68 is restricted. This restriction is made by inserting a limiter 78 to the integrator formed by the delay element 77 and the adder circuit 74.

Therefore, an incorrect detection, such as the sine wave next to the target to be detected, can be prevented.

Further, as $e^{j\omega}$ in the equation (1), the renewed $\omega$ sequentially renewed by the equation (2) is used, then if it is assumed it is sufficiently small, $$e^{j\omega} = \cos\omega + j\sin\omega = 1 + j\omega$$

Therefore, although the output of the limiter 12 is $\omega$, another input of the multiplier receives "1", and then $e^{j\omega}$ is input to the multiplier 74.

On the other hand, the training signal of 2900 Hz is detected by the circuits 53, 54, 57, 60 and 63 and supplied to the AND circuit 70. The counter 71 examines whether the times detected by the counter 71 are within the predetermined time (that is, the time of sending the alternate pattern) and when the time is longer than the predetermined time, it is determined that the training signal is detected.

In this connection, if the training signal of 1700 Hz is detected by phase and continuous time, it is not affected by noise in the network or level variations in the network, and an incorrect detection can be prevented and an accurate detection made.

Further, the training signal 2900 Hz is also detected by phase and continuous time, and thus an incorrect detection of a poor 1700 Hz tone is prevented and the training signal is accurately detected.

It is considered that the same circuit as that for detecting the training signal 1700 Hz may be used for the detection of the training signal 2900 Hz, however, this increases the hardware, and the detection of the training signal 2900 Hz is very important. Therefore, it is not necessary to detect the same precisely.

We claim:

1. An adaptive differential pulse code modulation system, comprising:
   an adaptive quantizer and an adaptive predictor which have a coding characteristic optimized to a voice signal;
   a quantizer and a predictor which have a coding characteristic optimized to a voice band modem signal; and
   means, coupled to said adaptive quantizer, said adaptive predictor, said quantizer and said predictor, for detecting a modem training signal and comprising:
   a phase synchronizing circuit which can detect a carrier frequency in a restricted region at a center of the carrier frequency; and
   means for detecting whether output power of the carrier frequency is larger than a predetermined threshold value, said modem training signal being detected, after detecting the carrier frequency by detecting that an output of said phase synchronizing circuit has not changed in polarity during a predetermined period, and that the output power is larger than a predetermined threshold value during said predetermined period, said system normally being used as a coding system optimized to said voice signal, and when said system detects a modem training signal, said system becomes a coding system optimized to said modem signal.

2. An adaptive differential pulse code modulation system according to claim 1, wherein said phase synchronizing circuit comprises a first band pass filter having a center frequency at a carrier frequency thereof, a first multiplier having an input connected to the output of said first band pass filter, a polarity detector connected to the output of said first multiplier, a second multiplier having a first input connected to the output of said polarity detector and a second input receiving a small positive value, a third multiplier having a first input connected to the output of said second multiplier, a limiter connected to the output of said third multiplier, a first delay element connected between the output of said limiter and a second input of said third multiplier, a fourth multiplier having a first input connected to the output of said limiter, a fifth multiplier having a first input connected to the output of said fourth multiplier and a second input receiving a value $e^{j\theta}$ and a first output connected to a second input of said first multiplier, a second delay element connected between the output of said fifth multiplier and a second input of said fourth multiplier, a sixth multiplier having a first input connected to the output of said first band pass filter and a second input connected to a second output of said fifth multiplier, a low pass filter connected to the output of said sixth multiplier and a zero cross discriminator connected to the output of said low pass filter and outputting the result of a synchronizing detection of the input signal.

3. An adaptive differential pulse code modulation system according to claim 2, wherein said means for detecting the output power of the carrier frequency further comprises a second band pass filter having a center frequency at an upper limit of a modem signal band and an input connected to an input terminal and a first filter for determining a square root mean of the output of said second band pass filter, a second filter for determining a square root mean connected to said input terminal, a seventh multiplier having a first input connected to the output of said second filter and a second input which receives a constant value, and a comparator which is connected to the outputs of said seventh multiplier and said first filter.

4. An adaptive differential pulse code modulation system, comprising:
- an adaptive quantizer and an adaptive predictor which have coding characteristics optimized to a voice signal;
- a fixed quantizer and a fixed predictor which have coding characteristics optimized to a voice band modem signal; and
- means, coupled to said adaptive quantizer, said adaptive predictor, said fixed quantizer and said fixed predictor, for detecting a modem training signal and activating said adaptive quantizer and predictor or said fixed quantizer and predictor, said system normally being used as a coding system optimized to said voice signal, and when said system detects a modem training signal, said system becomes a coding system optimized to said modem signal.

5. An adaptive differential pulse code modulation system according to claim 4, wherein training signal power of said modem training signal is always supervised, and when said training signal power becomes zero, said system is returned to a coding system optimized to said voice signal.

6. An adaptive differential pulse code modulation system according to claim 4, wherein said modem training signal is detected by using an alternative pattern signal of said modem signal.

* * * * *